United States Patent [19]

Lisalda

[11] 4,403,483
[45] Sep. 13, 1983

[54] BUCKET INSERT

[76] Inventor: Peter E. Lisalda, 14969 Redwood La., Chino, Calif. 91710

[21] Appl. No.: 339,364

[22] Filed: Jan. 15, 1982

[51] Int. Cl.³ .............................................. F25D 3/08
[52] U.S. Cl. ...................................... 62/457; 62/371; 62/459; 62/464
[58] Field of Search ................. 62/457, 458, 459, 371, 62/372, 529, 530, 463, 464, 465; 220/409, 412

[56] References Cited

U.S. PATENT DOCUMENTS

| 1,074,453 | 9/1913 | Park | 62/457 X |
| 1,186,418 | 6/1916 | Mischo | 62/457 |
| 1,768,976 | 7/1930 | Cuthbertson | 62/457 X |
| 1,782,720 | 11/1930 | Franklin | 62/465 X |
| 2,403,858 | 7/1946 | Groom et al. | 62/371 X |
| 2,935,858 | 5/1960 | Kingery | 62/371 |
| 3,482,418 | 12/1969 | Moore | 62/457 |
| 3,654,773 | 4/1972 | White | 62/371 |

FOREIGN PATENT DOCUMENTS 1124666  8/1968  United Kingdom ................ 220/409

Primary Examiner—Lloyd L. King
Attorney, Agent, or Firm—Fischer, Tachner & Strauss

[57] ABSTRACT

An apparatus for converting a standard conventional bucket into a bucket suitable for uses such as by fishermen for storage of bait, tackle, food and other such items. The converted bucket is also advantageously used for picnicing and by hunters and the like. The apparatus comprises a circular, planar base member having perforations along a continuous sector and a solid surface along the remainder thereof. The base member is adapted to receive a plurality of divider panels extending vertically above the base member and a plurality of support legs extending vertically below the base member. The divider panels from cold volume spaces above the perforated portion of the base member for storing food, bait and the like, while the panels form warmer volume spaces above the non-perforated portion of the base member for storing tackle, clothing and the like. The legs permit the base member to extend above ice which cools through the base member perforations.

7 Claims, 7 Drawing Figures

U.S. Patent   Sep. 13, 1983   4,403,483
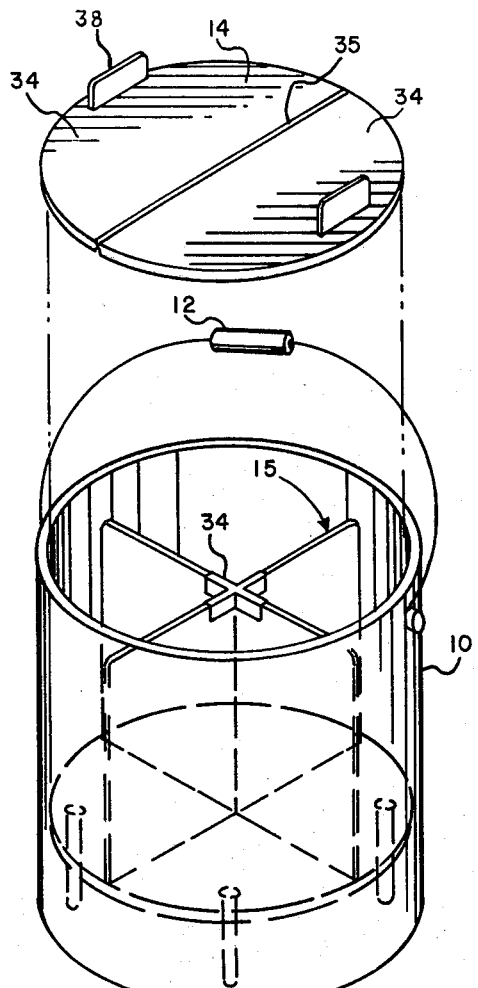
FIG. 1
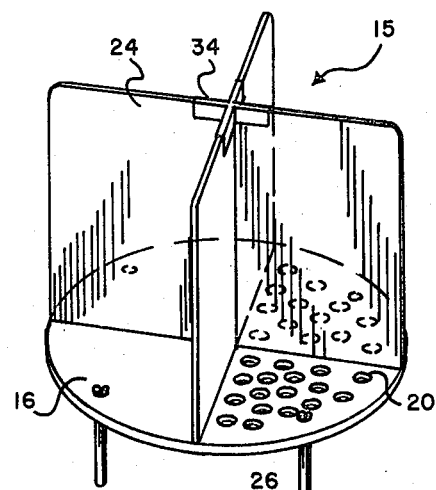
FIG. 2
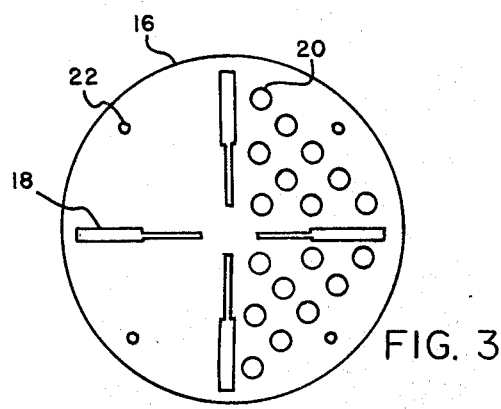
FIG. 3
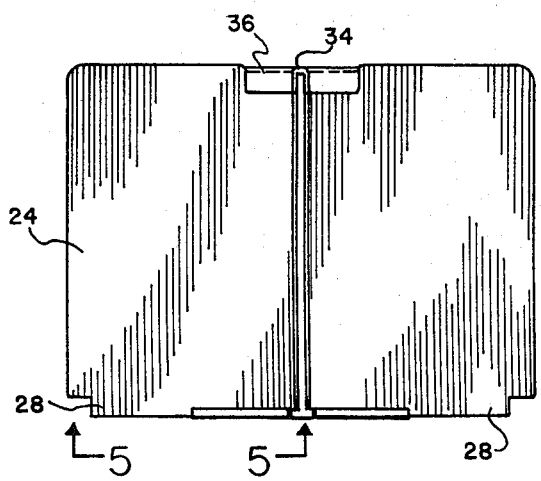
FIG. 4
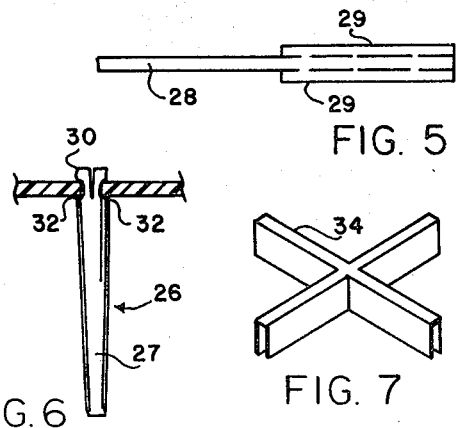
FIG. 5
FIG. 6
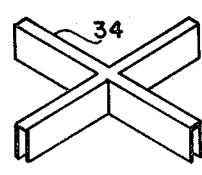
FIG. 7

BUCKET INSERT

BACKGROUND OF THE INVENTION

1. Field of the Invention

The present invention pertains to a bucket and more specifically, to an insert that is adapted to be inserted into a standard bucket or pail and to thereby adapt the bucket to advantageous uses such as by fisherman for containing and cooling bait, food and other items.

2. Prior Art

There are a number of U.S. patents which disclose bucket configurations for use by fisherman. By way of example, in U.S. Pat. No. 2,651,137 to Sweet, a bait bucket is disclosed having two interior contained buckets, one perforated and one solid. The perforated interior bucket is adapted to receive live bait in a water environment and the water is allowed to surround the enclosed wall interior bucket for cooling its contents which may be additional bait or other items. In U.S. Pat. No. 3,751,845 to Van Leeuwen, a fishing bucket is disclosed for containing minnows and which is covered by a lid over which is placed a generally crescent-shaped container which is adapted for containing food or beverages and over which is placed a sub-divided tray having a plurality of compartments containing various items of tackle such as hooks, sinkers and the like. A steel lid is placed over the tackle tray and is sub-divided into a plurality of compartments by means of a plurality of dividers to provide a sealing enclosure for the bucket. In addition, a crescent-shaped seat is placed over the lid and includes resilient cushioning material. U.S. Pat. No. 3,958,359 to Doughty discloses a sportman's combination recepticle and ice chest, and U.S. Pat. No. 2,797,525 to McCord discloses a tackle and bait carrier.

Unfortunately, none of the relevant prior art known to the applicant discloses an apparatus for use with standard, conventional buckets for converting same to advantageous use by fishermen for storing bait and other useful items. Furthermore, all such prior art is relatively difficult to manufacture and is therefore more costly. By way of example, the Sweet disclosure describes a bait bucket which requires a special outer bucket configuration as well as two specially manufactured interior buckets, one of which is perforated and one of which is not. As a consequence thereof, the outer bucket is non-standard and must be specially manufactured for the intended purpose and the inner buckets must also be specially manufactured and require costly hardware to secure them in proper relation to the exterior bucket.

SUMMARY OF THE INVENTION

The present invention overcomes or substantially reduces the aforementioned disadvantages of the prior art by providing a unique insert apparatus for a standard bucket to adapt such a bucket to the aforementioned advantageous uses such as by a fisherman for storing bait and other items. More importantly, the present invention is simple in structure and readily manufactured at low cost. In addition, the invention is readily inserted into already available low cost standard buckets thereby substantially reducing the expense incurred in procuring a fisherman's bucket incorporating the present invention as compared to prior art fishermen's buckets.

The present invention comprises an insert having a circular planar member forming a base for receiving a plurality of divider panels extending from one side thereof and a plurality of leg members extending from the other side thereof. The base is perforated preferably along only one or two quadrants thereof, to permit the passage therethrough of cool air derived from ice over which the base is adapted to be suspended by means of the aforementioned leg members. Divider panel members are typically inserted into the base from which they extend perpendicularly towards the top of the bucket when the apparatus is inserted in such a bucket. These inserted panels normally divide the volume within the bucket and above the base into four quadrants, two of which include the perforated base portions and two of which include base portions which are solid. The two quadrants that comprise perforated base portions are particularly suitable for storing bait because the base apertures in these quadrants provide passage holes through which the bait may be cooled by the ice. The remaining two quadrants, which comprise the solid base portions are thus isolated from the underlying ice and therefore provide suitable locations for storing items preferably kept in a warmer condition such as tackle and the like. The invention may be made of a unitary molded plastic assembly or from assemblable components of any suitable material and is adapted to conform to the interior dimensions of standard size buckets. An optional circular lid, comprising a pair of hinge foldable semi-circular portions, may be advantageously utilized for closing the top of the bucket above the apparatus of the present invention and for providing access to either pair of selected quadrants depending upon whether the user wishes to extract cooled bait or items stored in a warmer condition. In the preferred embodiment disclosed herein, the invention is formed entirely of plastic molded members that are designed for interconnection without the use of screws, pins or other such hardware which would otherwise complicate assembly and increase the cost of manufacture.

OBJECTS

It is therefore an object of the present invention to provide an insert apparatus for a bucket which substantially reduces or entirely overcomes the aforementioned disadvantages of the prior art.

It is another object of the present invention to provide an insert apparatus for a bucket, the apparatus being compatible with standard, readily available buckets and when inserted therein, providing a fisherman with a plurality of separated compartments therein at least one of which is in direct communication with ice contained within the bucket for the purpose of storing bait and at least one of which is isolated from the ice to provide means for storing food or other items in a warmer condition.

It is still an additional object of the present invention to provide an insert apparatus for a bucket which is readily compatible with standard buckets for converting same to a multiple compartment storage device primarily for use by fisherman and which is of substantially reduced complexity and cost as compared to prior art apparatus used for the same purpose.

BRIEF DESCRIPTION OF THE DRAWINGS

FIG. 1 is an isometric view of a bucket incorporating the insert apparatus of the present invention;

FIG. 2 is an isometric view of only the insert apparatus of the present invention;

FIG. 3 is a top view of the base portion of the present invention;

FIG. 4 is a side view of the divider panels of the present invention illustrating the manner in which the divider panels and base portion of the invention are interconnected;

FIG. 5 is an enlarged view taken along lines 5—5 and further illustrating the manner in which the base portion and divider panels are interconnected;

FIG. 6 is an enlarged view of the invention illustrating the manner in which the base portion and leg members are interconnected; and FIG. 7 is an enlarged view of the cross-clamp of the invention.

DETAILED DESCRIPTION OF A PREFERRED EMBODIMENT

Referring now to FIG. 1, there is shown a bucket 10 of conventional cylindrical configuration including a conventional handle device 12 connected to the upper portion of the side walls of the bucket 10 to provide convenient means for transferring the bucket. A foldable lid 14 is also illustrated in FIG. 1 and is preferably designed to provide access to the interior of the bucket 10 in a particular manner as will be hereinafter more fully described. As also seen in FIG. 1, an insert apparatus 15 of the present invention is designed to be contained within the interior of the bucket and to generally conform to the interior dimensions thereof.

As seen best in FIGS. 2 and 3, the insert apparatus 15 of the present invention comprises a base member 16, a set of divider panels 24 and a plurality of leg members 26. Base member 16 is a substantially planar, circular-shaped member having a plurality of receiving slots 18. In the preferred embodiment of the invention there are four such receiving slots symmetrically located along the base member and oriented in a radial direction thereby dividing the base member 16 into four quadrants. Base member 16 also includes a plurality of apertures or colling passages 20 located on one side of the base member in two adjacent quadrants. It is seen in FIGS. 2 and 3 that the other side of base member 16 is free of such apertures.

Also included in base member 16 is a plurality of support leg receiving apertures 22, preferably spaced symmetrically around the entire base member adjacent the perimeter thereof. Apertures 22 are adapted to receive support legs 26 which are affixed therethrough in the manner illustrated in FIG. 6. More specifically, as shown in FIG. 6, each leg support 26 includes an elongated cylindrical portion 27 and a V-shaped cap member 30. Cylindrical portion 27 is inserted through an aperture 22 until cap member 30, which is larger than the aperture 22, comes in contact with the upper surface of base member 16. V-shaped cap member 30 comprises annular groove 32 which is designed to receive the base member 16 to secure the support leg in substantially fixed relation relative to the base member. A plurality of support legs 26 extend below the base member to provide support of the base member in an elevated position relative to the floor of bucket 10. In effect, support legs 26 provide a compartment between the base member and the bottom of the bucket in which to store a cooling substance such as ice.

Divider panels 24 may be assembled from a plurality of individual component divider panels or from a pair of perpendicularly interconnected double panels to form the four quadrants illustrated in FIGS. 2 and 4. However, in the embodiment illustrated herein they are preferably formed from four molded plastic structure comprising the four quadrature panels. As seen in FIG. 4, each such panel is provided with a substantially planar tab member 28 extending from the lowermost edge thereof and adapted to be inserted through one of the divider receiving slots 18 seen best in FIG. 3. Each such tab member is provided with a pair of feet 29 adapted for engagement with base member 16 on opposite edges of each receiving slot 18 along the narrowed portion thereof as seen best in FIG. 3. It will be understood that the relative dimensions of tab members 28 and divider receiving slots 18 should preferably be sufficiently matched to provide a relatively tight fit therebetween which precludes any substantial play after panels 24 are installed onto base member 16.

As seen best in FIG. 4, each panel 24 includes a recessed portion 36 along the upper edge and adjacent the intersection with the other panels. The four recessed portions 36 of the assembled divider panels 24 are adapted to receive a cross-clamp 34 shown best in FIG. 7. Cross-clamp 34 is designed to be secured to the top edge of all four divider panels as shown in FIGS. 1 and 2 to provide unitary securing means to stabilize the panels to one another.

When the fully assembled insert apparatus of the present invention is inserted into a suitable standard bucket 10 as shown in FIG. 1, lid 14 is preferably placed in coaxial engagement with the opening of bucket 10 along the top surface of panels 24 in order to provide a convenient means for enclosing the bucket. As seen in FIG. 1, lid 14 is preferably formed from a pair of semi-circular members 34 interconnected along a common abutting atraight edge 35 which serves as a hinge. This lid permits the opening of one semi-circular portion 34 at a time to provide access to a pair of selected quadrants depending upon the relative rotational position of lid 14 relative to panels 24. A pair of molded handles 38 are integral to the respective semi-circular members 34 to provide a convenient means for raising each such semi-circular member about hinge edge 36 to obtain the aforementioned access.

It will now be understood that what has been disclosed herein comprises a unique insert apparatus for a fisherman's bucket and that is designed to be inserted into a conventional cylindrical bucket to adapt it to advantageous storage use by fishermen. The apparatus comprises a base member having cooling apertures along at least a portion thereof and adapted to receive a plurality of panel members for dividing the bucket into a plurality of interior separated volumes. The base member is also adapted to receive a plurality of support legs for supporting the base member and panels in extending relation with respect to the bottom of the bucket thereby forming a cylindrical compartment which is adapted to receive a cooling medium such as ice. The cooling apertures of the base member provide at least one interior separated volume which is in direct communication with the underlying cooling medium and is thus preferably adapted to receive items such as bait and the like for which indirect contact with the cooling medium is desirable. Similarly, the base member is also imperforate and thus free of apertures along at least a portion thereof to provide at least one interior separated volume which is isolated from the cooling medium to provide an interior volume that remains in a relatively ambient temperature condition for receiving items such as tackle, food and the like that are preferably isolated from the cooling medium in a warmer condition. In addition, an optional overlying hinged lid is provided for enclosing the bucket with the apparatus of the invention included therein and for providing convenient access to one or more of the contained volumes provided by the present invention.

As a result of the teaching herein disclosed, those having skill in the art to which the present invention pertains will now understand that various additions and modifications may be made to the present invention. By way of example, the number of panels may be changed to provide a different number of contained volumes within the bucket. Furthermore, the manner in which the panels and the support legs interconnect with the base member may be readily modified to provide other suitable means for interconnection. Accordingly, it will be understood that all such modifications and additions are contemplated to be within the scope of the invention which is to be limited only by the claims appended hereto.

I claim:

1. An apparatus for converting a standard bucket into a bucket advantageously used by fishermen, hunters, picnicers and the like, and having a plurality of separated compartments for storing bait, tackle, food and other items advantageous for fishing, and ice for selected cooling of such items; the apparatus comprising:
    a circular, planar base member adapted to substantially conform to the inner dimensions of said bucket and having perforations along at least a 90 degree sector;
    a plurality of divider panels extending perpendicularly from said base member and dividing said base member into isolated perforated and non-perforated sectors; and
    a plurality of support legs extending perpendicularly from said base member opposite said divider panels for supporting said base member and divider panels above ice within said bucket.

2. The apparatus recited in claim 1 wherein said base member comprises radially directed slots and wherein said divider panels comprise means for extending through said slots for affixing said panels to said base member.

3. The apparatus recited in claim 1 wherein said apparatus comprises four of said divider panels separating said base member into four quadrants.

4. The apparatus recited in claim 3 wherein at least one of said base member quadrants is perforated and at least one of said base member quadrants is imperforate.

5. The apparatus recited in claim 4 wherein said perforated base member quadrants are adapted to permit corrective cooling through said perforations when said apparatus is inserted into said bucket containing said ice.

6. The apparatus recited in claim 4 wherein said imperforate base member quadrants are adapted to prevent corrective cooling from said perforated base member quadrants when said apparagtus is inserted into said bucket containing said ice.

7. The apparatus recited in claims 1, 2, 3, or 4 further comprising a bucket lid having a pair of semi-circular planar members hinged as their common straight edge for opening to provide selected access to said compartments when said apparatus is inserted in said bucket.

* * * * *